July 4, 1961    O. E. BLUME    2,990,666
LAWN MOWER HAVING COLLECTING UNIT
Filed Sept. 2, 1958    2 Sheets-Sheet 1

INVENTOR.
Orville E. Blume
BY
ATTORNEY.

July 4, 1961  O. E. BLUME  2,990,666
LAWN MOWER HAVING COLLECTING UNIT
Filed Sept. 2, 1958  2 Sheets-Sheet 2

INVENTOR.
Orville E. Blume
BY
ATTORNEY.

United States Patent Office 2,990,666
Patented July 4, 1961

2,990,666
LAWN MOWER HAVING COLLECTING UNIT
Orville E. Blume, 8120 Willow Way, Kansas City, Mo.
Filed Sept. 2, 1958, Ser. No. 758,247
3 Claims. (Cl. 56—25.4)

This invention relates to a grass collector for lawn mowers characterized by the fact that its use may be extended to the cleaning of lawns of many other types of debris such as leaves, twigs, trash and the like and having as still another important feature, an arrangement of parts such as to virtually eliminate clogging problems irrespective of the heaviness of the grass or weeds being cut.

It is the most important object of the instant invention to provide a lawn cleaning structure for lawn mowers that is in no sense cumbersome; that is in the nature of a relatively small, compact, lightweight unit; that is of such nature as to permit use thereof in and around trees, bushes and fences without interference because of the parts that make up the collecting unit; that presents no hazards or difficulties insofar as the operator is concerned, particularly with respect to dust; and that permits quick and easy disposal of the collected material.

Another important object of the present invention is to provide in the aforementioned improvements, pick-up means for the cuttings and other debris that is unusually powerful because of a unique air-flow principle to the end that the lawn is swept completely clean regardless of the conditions of use.

Other important features of the invention include the strategic disposition and form of certain baffling so as to properly direct the cuttings into a container therefor, and assure proper air flow without loss of material to be collected; the provision of a container that overlies the engine of the mower so as to be out of the way, yet easily and quickly removed for dumping purposes; and the provision of a novel cover for the container which may be removed and which has a part thereof, air exhaust means disposed to prevent dust flow to the operator and having means also to prevent loss of the cuttings through the air outlets.

Figure 1:
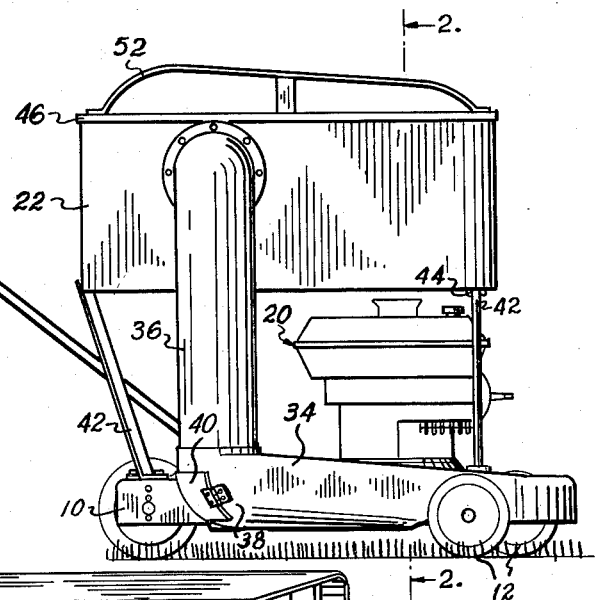
FIG. 1 is a side elevational view of a lawn mower having a collecting unit made pursuant to my present invention.

The lawn mower illustrated in the drawings is of the well-known type that includes a downwardly facing, hollow platform rendered mobile through use of a plurality of ground wheels 12 and having grass cutting means in the nature of an elongated blade 14 beneath the platform 10.

Figure 2:
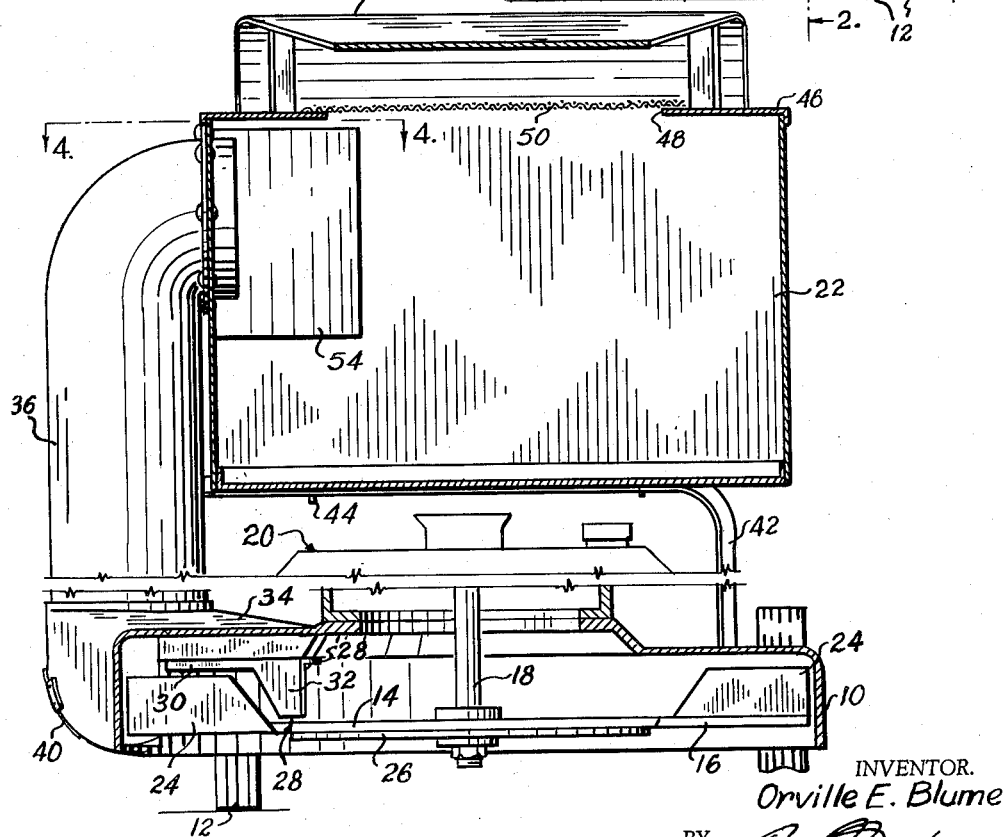
FIG. 2 is an enlarged, vertical, cross-sectional view taken on line 2—2 of FIG. 1.
Figure 4:
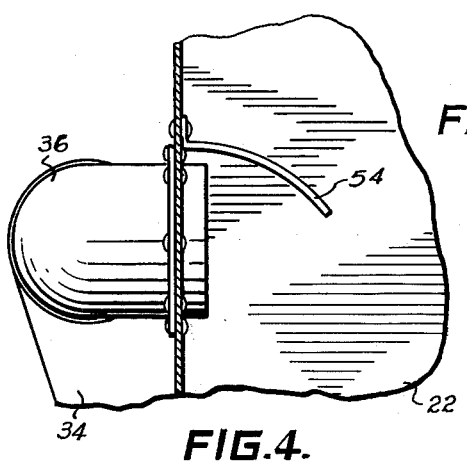
FIG. 4 is a fragmentary, detailed, cross-sectional view taken on line 4—4 of FIG. 2.
Figure 3:
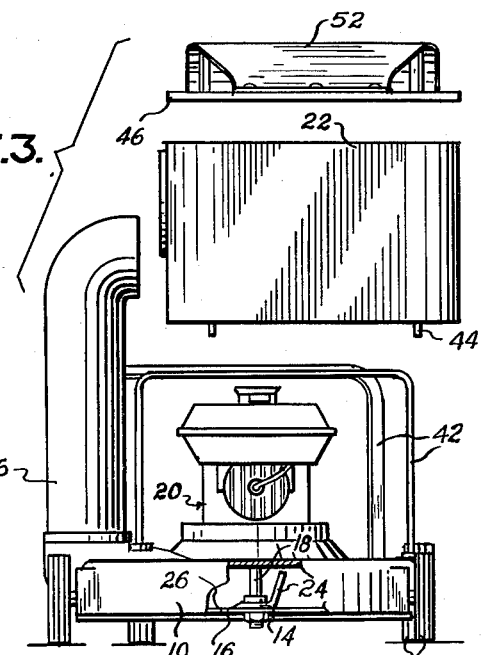
FIG. 3 is a front elevational view with parts partially broken away and shown in section and partially exploded to illustrate the ready removal of the collecting container and its closure or cover.

Blade 14 has opposed cutting edges 16 adjacent the ends thereof and is suitably mounted on vertical drive shaft 18 of engine 20 that is carried by the platform 10 in the usual manner. Blade 14 is specially made to effectively force grass cuttings and other debris such as leaves and trash, into a collecting container 22 carried by the platform 10 and to create a draft or air flow that will enhance such result. To this end, there is provided a pair of upwardly extending, slightly inclined vanes or impellers 24 integral with the blade 14 at the ends thereof. As best seen in FIGS. 2 and 3, a vane 24 is provided behind each cutting edge 16 respectively in opposed relationship thereto, the sharpened cutting means 16 being in a leading position considering the direction of rotation of the blade 14 as seen in FIG. 6, and vanes 24 being in a trailing position and inclined upwardly and rearwardly from the blade 14.

To further enhance proper air flow and prevent loss of cuttings back to the ground after severance, the median part of the blade 14 is blocked by a disc 26 similarly attached to the shaft 18 and/or the blade 14. Consequently, those two portions of the blade 14 which are each provided with a cutting edge 16 and an opposed vane 24, extend radially outwardly from the periphery of the disc 26, but the entire unit is within the confines of the hollow platform 10 as is clear in FIG. 2.

The construction just above described is such as to cause the cuttings above the blade 14 and the disc 26 to be forcefully directed outwardly in a tangential direction and to the end that such cuttings are not carried around the platform 10 more than one revolution, and to prevent entanglement thereof around the shaft 18, there is provided a baffle 28 attached to the platform 10 in depending relationship thereto, and substantially complemental to the shape of the vanes 24.

Figure 5:
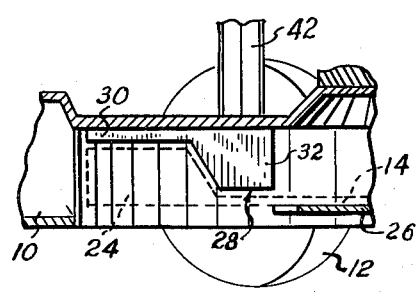
FIG. 5 is a fragmentary, detailed, cross-sectional view taken on line 5—5 of FIG. 6, but on an enlarged scale and inverted therefrom.
Figure 6:
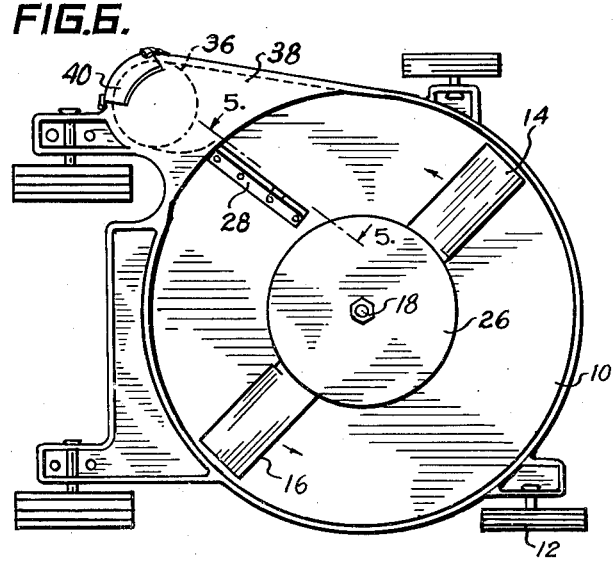
FIG. 6 is an inverted view looking at the lawn mower from the bottom thereof.
Figure 7:
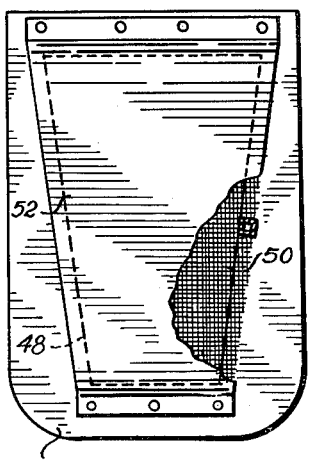
FIG. 7 is a plan view of the aforementioned cover, parts being broken away for clearness.

As seen in FIGS. 2, 5 and 6, the upper edges of the vanes 24 are spaced from the lower face of the platform 10; therefore, the baffle 28 partially overlies the vanes 24 as the latter pass therebeneath (note elongated finger 30 forming a part of the baffle 28). Thus, sufficient clearance is provided between the vanes 24 and the platform 10 thereabove to prevent clogging or jamming, especially when the cuttings are damp and therefore, tend to mat, but at the same time the finger 30 effectively prevents continuous whirling of the cuttings within the platform 10 and causes the same to be properly directed into the container 22.

Baffle 28 is also provided with a wider portion 32 that depends farther from the platform 10 toward the blade 14 inwardly of the vanes 24, thereby acting as a bar to the action of the blade 14 tending to carry the cuttings beyond the point of discharge from the platform 10 into a hollow chute 34. Baffle 28 is disposed adjacent the chute 34 tangential to the disc 26 to the end that when the upper edge of either vane 24 is directly beneath the baffle 28, it will be in substantial alignment therewith as indicated by dotted lines in FIG. 5.

The hollow chute 34 manifestly communicates directly with the platform 10 and with an upstanding conduit or pipe 36 that discharges into the side of the container 22 as is apparent in FIGS. 1–4. The tendency to clog is also prevented by virtue of the shape and configuration of the chute 34 which progressively increases in cross-sectional area in all directions as the pipe 36 is approached. In the event that clogging should occur under extremely wet conditions, the elbow 38 of chute 34, i.e., the point where the cuttings must make an abrupt upward turn into the pipe 36, is provided with a suitable clean-out door 40 handily disposed for easy access by the operator.

Container 22 is supported in overlying relationship to the engine 20 without any overlapping beyond the sides of the platform 10 by suitable framework such as upstanding, stilt-like brackets 42 rigid to the platform 10. Brackets 42 are transversely L-shaped to properly seat the container 22 and if desired, a number of small pins 44 may be provided on the container 22 fitting loosely in openings within brackets 42 to hold the container 22 against displacement, yet permit its ready removal as depicted in FIG. 3. By the same token, the container 22 may be easily slipped from place with respect to the upper end of pipe 36 when the contents of container 22 are to be emptied.

The open top container 22 has a cover 46 that is readily removable and which is provided with an opening 48 covered by a screen 50 or other foraminous material.

Any dust that may be carried with the air flowing upwardly through the screen 50, is deflected laterally away from the operator by an upwardly-arched deflector 52 mounted on the cover 46 and spaced above the screen 50 so that the air may move freely in both directions laterally of the container 22. Through such construction the cuttings are held in the container 22 by the screen 50 and at the same time there is no impedance to the draft flowing from beneath the platform 10 through the pipe 36 into the container 22 and thence laterally of the hood or deflector 52.

To the end that the cuttings do not merely pile within the container 22 and ultimately clog the outlet of the pipe 36, there is provided a curved baffle 54 mounted on the side wall of container 22 adjacent the outlet of pipe 36 and disposed to direct the cuttings toward the front end of the container 22. By such construction, it is possible to completely fill the container 22 without operator attention before it becomes necessary to remove the same from the brackets 42 and empty the contents.

Having thus described the invention what is claimed as new and desired to be secured by Letters Patent is:

1. In a lawn mower, a mobile, downwardly opening platform; an outlet chute connected to said platform in communication therewith and disposed in substantially tangential relationship thereto; an engine mounted on said platform and having a vertical drive shaft extending downwardly through the platform and terminating at a point spaced below the lower face of the platform; a normally horizontal blade secured to the drive shaft at said point for rotation therewith, the outer extremities of the blade terminating in closely spaced relationship to the lower face of said platform; a vane secured to each of the opposed, outer extremities of the blade, said vanes extending upwardly and outwardly from the blade in vertical spaced relationship to the lower face of the platform, whereby during rotation of the blade, the vanes lift lawn cuttings and move the same toward said outlet chute along a circular path; an elongated baffle secured to the lower face of said platform in depending relationship thereto proximal to said outlet chute and disposed in alignment with the latter to direct the cuttings into the chute, said baffle extending inwardly toward said drive shaft and having a notch therein clearing respective vanes during rotation of the blade; a container having a side and removably carried by the platform thereabove; and a conduit joined to said outlet chute and discharging into said container through the side thereof.

2. A lawn mower as set forth in claim 1, wherein a disc is secured to said shaft at said point on the latter in coaxial relationship thereto, the extremities of said blades extending outwardly from the periphery of the disc.

3. A lawn mower as set forth in claim 1, wherein frame means is secured to the platform thereabove and is provided with a series of openings therein lying in a horizontal plane, said container being provided with a plurality of depending pins on the bottom thereof disposed to be removably received within respective openings in said frame means to thereby retain the container on the platform, the uppermost end of said container being open, there being a removable closure over said open top of the container having side air outlets for permitting air to discharge from the open top of the container only in substantially horizontal directions, and means over said open top of the container for preventing cuttings from passing out of the container while permitting free flow of air therefrom.

References Cited in the file of this patent
UNITED STATES PATENTS

| | | |
|---|---|---|
| 2,701,942 | Caldwell et al. | Feb. 15, 1955 |
| 2,720,070 | Arrington | Oct. 11, 1955 |
| 2,720,742 | Hilton | Oct. 18, 1955 |
| 2,779,146 | Mitchell et al. | Jan. 29, 1957 |
| 2,807,126 | Bennett | Sept. 24, 1957 |
| 2,809,389 | Collins et al. | Oct. 15, 1957 |
| 2,833,102 | Roof | May 6, 1958 |
| 2,877,616 | Gewalt et al. | Mar. 17, 1959 |